July 5, 1966   W. I. UYEHARA   3,259,167
RESILIENT WHEEL
Filed Jan. 14, 1965
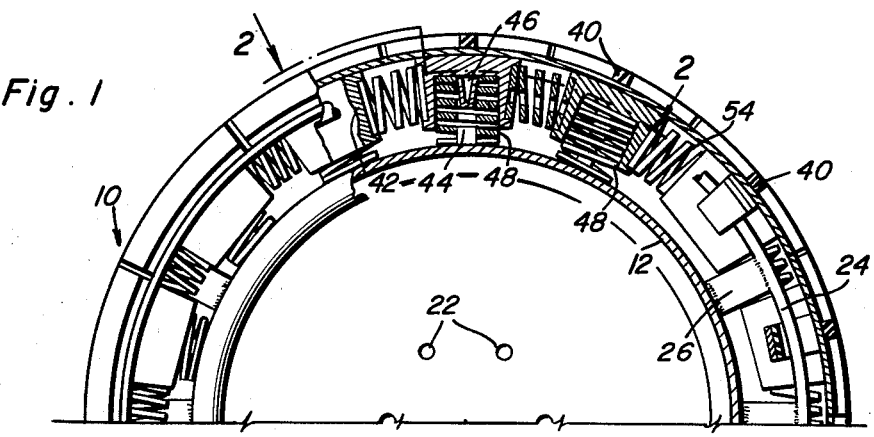
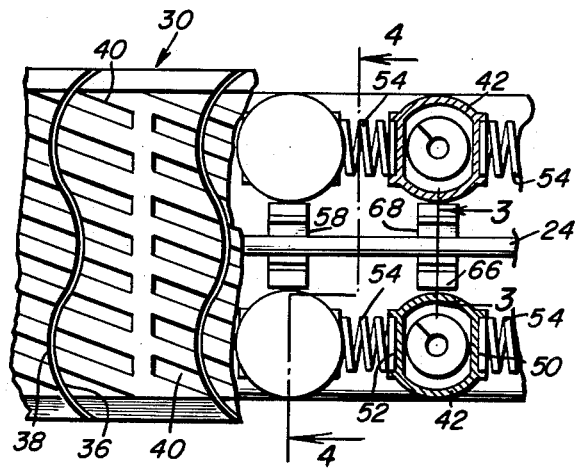
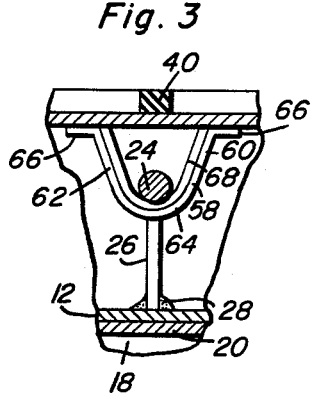
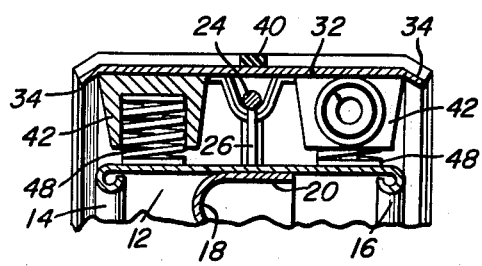
William I. Uyehara
INVENTOR.

United States Patent Office 3,259,167
Patented July 5, 1966

3,259,167
RESILIENT WHEEL
William I. Uyehara, 2522 Date St., Honolulu, Hawaii
Filed Jan. 14, 1965, Ser. No. 425,473
13 Claims. (Cl. 152—13)

This invention relates to a novel and useful resilient wheel and more specifically to a resilient wheel including a generally cylindrical rim portion having individual tread members supported outwardly therefrom and spaced circumferentially thereabout and yieldably supported from the rim portion in a manner such that the tread portions or members may compensate for uneven ground over which the wheel is rolling whereby a substantial portion of the ground shock will not be transmitted to the cylindrical rim portion of the wheel which is provided with means adapting it to be secured to a journalled hub portion.

The resilient wheel of the instant invention includes structural features which adapt for use on lightweight vehicles although the wheel is primarily designed for use on heavy vehicles. Further, the resilient wheel of the instant invention is constructed in a manner such that it may have the tread portions thereof contacting the ground readily conform to irregular portions of the ground alternately inclined up and down in the direction in which the wheel is rolling as well as in a direction extending transversely of the wheel.

The main object of this invention is to provide a resilient wheel including structural features thereof which particularly well adapt the resilient wheel for use on numerous types of wheeled vehicles.

Another object of this invention is to provide a resilient wheel which may be readily manufactured utilizing conventional forms of manufacture.

Still another object of this invention is to provide a resilient wheel including resiliently supported and closely circumferentially spaced tread portions or members including circumferentially overlapping adjacent edge portions spaced transversely of the wheel so as to produce the amount of noise developed by the resilient wheel going at a fast rate of speed over a smooth road surface.

A final object of this invention is to provide a resilient wheel in accordance with the preceding objects which will conform to conventional forms of manufacture, be of simple construction and readily adaptable to substantially all types of wheeled vehicles so as to provide a device that will be economically feasible, long lasting and usable on many types of vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of the resilient wheel of the instant invention shown with parts thereof being broken away and in vertical section;

FIGURE 2 is an enlarged fragmentary sectional view taken substantially upon the plane indicated by section line 2—2 of FIGURE 1;

FIGURE 3 is an enlarged fragmentary sectional view taken substantially upon the plane indicated by section line 3—3 of FIGURE 2; and FIGURE 4 is a vertical sectional view taken substantially upon the plane indicated by section line 4—4 of FIGURE 2.

Referring now more specifically to the drawings, the numeral 10 generally designates the resilient wheel of the instant invention. The wheel 10 includes a generally cylindrical rim portion 12 including rolled and reinforced opposite end edge portions 14 and 16. The wheel 10 further includes a center disk portion 18 which has a generally cylindrical outer peripheral portion 20 secured to the inner surface of the rim portion 12 in any convenient manner. The center disk portion 18 is suitably apertured as at 22 so as to adapt the disk portion 18 for securement to a journalled hub portion (not shown).

An annular and continuous retaining ring 24 of a larger diameter than the rim portion 12 is concentrically disposed relative to the latter and supported therefrom by means of generally radially extending support members 26 carried by the retaining ring 24 and secured to the rim portion 12 in any convenient manner such as by welding 28. The support members 26 are spaced circumferentially about the rim portion 12 and it may be seen that a plurality of tread members each generally designated by the reference numeral 30 are provided and disposed circumferentially about the wheel 10. Each of the tread members 30 includes an elongated and transversely extending mounting plate 32 whose opposite end portions are radially inwardly directed as at 34. The confronting edge portions of adjacent mounting plates 32 include complementary alternately reversely curving edge surfaces 36 and 38 which enable the mounting plates 32 to include portions thereof which overlap the adjacent mounting plates 32 circumferentially about the wheel 10.

Each of the mounting plates 32 includes a plurality of resilient ground engaging lugs 40 and a plurality of radially inwardly opening cup members 42 which are secured to the inner surface of the mounting plate 32 in any convenient manner. The cup members 42 are carried by opposite end portions of each of the mounting plates 32 and the rim portion 12 includes pairs of radially outwardly projecting rubber bumpers 44 which oppose each pair of cup members 42. Disposed in each of the cup members 42 is a radially inwardly projecting abutment 46 and a pair of compression springs 48 are provided for each of the mounting plates 32 with their outer ends telescopingly received within the corresponding cup members and their radial innermost ends embracing the corresponding bumpers 44. Still further, each of the cup members 42 also defines a pair of oppositely facing and circumferentially opening seats 50 and 52 and a pair of compression springs 54 are disposed between each pair of adjacent cup members with their opposite ends seatingly received in the corresponding seats 50 and 52.

Each tread member 30 further includes lost motion connection defining means in the form of a generally U-shaped member 58 including a pair of legs 60 and 62 interconnected by means of a curved bight portion 64 at one pair of corresponding ends and including laterally directed mounting tab portions 66 at the other pair of corresponding ends which are secured to the inner surface of the corresponding mounting plate 32 in any convenient manner between the corresponding cup members 42. The inner surface of each member 58 includes a resilient lining 68 and each of the U-shaped members 58 loosely embraces the corresponding portion of the retaining ring 24 and thereby limits radial outward movement of the mounting plate 32 relative to the rim portion 12. In addition, the U-shaped members 58 each mount the corresponding mounting plate 32 from the retaining ring 24 for limited movement circumferentially thereabout between the adjacent support members 26, oscillation about an axis disposed tangentially relative to the adjacent portion of the retaining ring 24 and limited radial movement relative to the adjacent portion of the rim portion 12.

In operation, the wheel 10 may be mounted on a suitable hub portion by means of the center disk portion 18 in a manner as hereinbefore set forth and utilized to support a load. As the wheel 10 rolls over an uneven supporting surface, the mounting plates 32 may move a limited amount radially of the rim portion 12 and circumferentially about the adjacent portion of the retaining ring 24. Still further, the mounting plates 32 may oscillate about an axis disposed substantially tangentially relative to the adjacent portion of the retaining ring 24. In this manner, it may be seen that the mounting plates 32 and the various springs 48 and 54 may absorb considerable shock without transmitting road shock to the rim portion 12.

The resilient lugs or tread elements 40 may of course be disposed in any pattern on each of the mounting plates 32 and may be of any desirable configuration. Still further, inasmuch as alternate transversely spaced portions of adjacent mounting plates 32 circumferentially overlap each other the tire noise caused by the tire 10 rolling at high speed over a smooth surface is maintained at a minimum.

The compression springs 48 and 54 are to be removably secured to the rim portion 12, the cup members 42, and in the seats 50 and 52 in any convenient manner such as by clips or removable fasteners (not shown) or fixedly secured to the rim portion 12, the cup members 42 and in the seats 50 and 52 by means of suitable welding (not shown) or the like.

By anchoring the springs 48 and 54 to the respective portions of the apparatus against which they abut additional lateral support of the mounting plates 32 relative to the rim portion 12 is afforded. The outer ends of the springs 48 are telescopically received in the cup members 42 and there is sufficient clearance between the springs 48 and the surfaces of the cup members 42 defining the blind bores in which the radial outermost ends of the springs 48 are received to enable slight lateral movement of the mounting plate 32 relative to the rim portion 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A resilient wheel comprising a generally cylindrical rim portion including means adapted to be secured to a wheel hub, outer retaining means defining a ring of larger diameter than and concentric with said rim portion and disposed between parallel planes containing the opposite ends of said rim portion, support means spaced circumferentially about said rim portion and connected between the latter and said retaining ring supporting the latter from the former, a plurality of tread members disposed outwardly of said retaining ring means and including means defining a lost motion connection with said retaining means limiting radial outward and inward movement of said tread members relative to said retaining ring means, resilient means operatively connected between said tread members and the confronting opposite end portions of said rim portion on opposite sides of said retaining ring means yieldingly urging said tread members toward their radial outermost positions relative to said rim portion, said lost motion connection defining means each also including means oscillatably receiving said retaining ring means for oscillation of the corresponding tread member about an axis disposed generally tangentially relative to said retaining ring means.

2. A resilient wheel comprising a generally cylindrical rim portion including means adapted to be secured to a wheel hub, outer retaining means defining a ring of larger diameter than and concentric with said rim portion and disposed between parallel planes containing the opposite ends of said rim portion, support means spaced circumferentially about said rim portion and connected between the latter and said retaining ring supporting the latter from the former, a plurality of tread members disposed outwardly of said retaining ring means and including means defining a lost motion connection with said retaining means limiting radial outward and inward movement of said tread members relative to said retaining ring means, resilient means operatively connected between said tread members and the confronting opposite end portions of said rim portion on opposite sides of said retaining ring means yieldingly urging said tread members toward their radial outermost positions relative to said rim portion, said lost motion connection defining means each also including means slidably connecting the corresponding tread member to the corresponding portion of said retaining ring means for movement circumferentially thereabout.

3. The combination of claim 2 wherein said lost motion connection defining means and said support means define coacting means limiting sliding movement each of said tread members circumferentially about said retaining ring means between two corresponding limit positions.

4. A resilient wheel comprising a generally cylindrical rim portion including means adapted to be secured to a wheel hub, outer retaining means defining a ring of larger diameter than and concentric with said rim portion and disposed between parallel planes containing the opposite ends of said rim portion, support means spaced circumferentially about said rim portion and connected between the latter and said retaining ring supporting the latter from the former, a plurality of tread members disposed outwardly of said retaining ring means and including means defining a lost motion connection with said retaining means limiting radial outward and inward movement of said tread members relative to said retaining ring means, resilient means operatively connected between said tread members and the confronting opposite end portions of said rim portion on opposite sides of said retaining ring means yieldingly urging said tread members toward their radial outermost positions relative to said rim portion, said lost motion connection defining means each define a generally radially extending opening in which the corresponding portion of said retaining ring means is slidably and rotatably received.

5. A resilient wheel comprising a generally cylindrical rim portion including means adapted to be secured to a wheel hub, outer retaining means defining a ring of larger diameter than and concentric with said rim portion and disposed between parallel planes containing the opposite ends of said rim portion, support means spaced circumferentially about said rim portion and connected between the latter and said retaining ring supporting the latter from the former, a plurality of tread members disposed outwardly of said retaining ring means and including means defining a lost motion connection with said retaining means limiting radial outward and inward movement of said tread members relative to said retaining ring means, resilient means operatively connected between said tread members and the confronting opposite end portions of said rim portion on opposite sides of said retaining ring means yieldingly urging said tread members toward their radial outermost positions relative to said rim portion, said lost motion connection defining means each also include means oscillatably receiving said retaining ring means for oscillation of the corresponding tread member about an axis disposed tangentially relative to said retaining ring means, resilient means disposed between corresponding end portions of adjacent tread members yieldably urging said tread members circumferentially about said retaining ring means relative to and toward centered positions relative to each other.

6. A resilient wheel comprising a generally cylindrical rim portion including means adapted to be secured to a wheel hub, outer retaining means defining a ring of larger diameter than and concentric with said rim portion and disposed between parallel planes containing the opposite ends of said rim portion, support means spaced circumferentially about said rim portion and connected between the latter and said retaining ring supporting the latter from the former, a plurality of tread members disposed outwardly of said retaining ring means and including means defining a lost motion connection with said retaining means limiting radial outward and inward movement of said tread members relative to said retaining ring means, resilient means operatively connected between said tread members and the confronting opposite end portions of said rim portion on opposite sides of said retaining ring means yieldingly urging said tread members toward their radial outermost positions relative to said rim portion, said lost motion connection defining means each also include means oscillatably receiving said retaining ring means for oscillation of the corresponding tread member about an axis disposed tangentially relative to said retaining ring means, said lost motion connection defining means each also include means slidably connecting the corresponding tread member to the corresponding portion of said retaining ring means for movement circumferentially thereabout.

7. The combination of claim 6 wherein said lost motion connection defining means and said support means define coacting means limiting sliding movement each of said tread members circumferentially about said retaining ring means between two corresponding limit positions.

8. The combination of claim 6 wherein said lost motion connection defining means and said support means define coacting means limiting sliding movement each of said tread members circumferentially about said retaining ring means between two corresponding limit positions, resilient means disposed between corresponding end portions of adjacent tread members yieldably urging said tread members circumferentially about said retaining ring means relative to and toward centered positions relative to each other.

9. A resilient wheel comprising a generally cylindrical rim portion including means adapted to be secured to a wheel hub, outer retaining means defining a ring of larger diameter than and concentric with said rim portion and disposed between parallel planes containing the opposite ends of said rim portion, support means spaced circumferentially about said rim portion and connected between the latter and said retaining ring supporting the latter from the former, a plurality of tread members disposed outwardly of said retaining ring means and including means defining a lost motion connection with said retaining means limiting radial outward and inward movement of said tread members relative to said retaining ring means, resilient means operatively connected between said tread members and the confronting opposite end portions of said rim portion on opposite sides of said retaining ring means yieldingly urging said tread members toward their radial outermost positions relative to said rim portion, said lost motion connection defining means each define a generally radially extending opening in which the corresponding portion of said retaining ring means is slidably and rotatably received, said lost motion connection defining means and said support means define coacting means limiting sliding movement each of said tread members circumferentially about said retaining ring means between two corresponding limit positions.

10. A resilient wheel comprising a generally cylindrical rim portion including means adapted to be secured to a wheel hub, a plurality of plate-like tread members disposed outwardly of said rim portion and spaced circumferentially thereabout, said tread members and retaining means including coacting means defining a lost motion connection between said retaining means and said tread members mounting said tread members for limited generally radial movement relative to said rim portion, between two limit positions, urging means operatively connected between said rim portion and said tread members yieldingly urging said tread members to their radial outermost positions, said coacting means and the lost motion connection established thereby between said rim portion and said tread members also including means mounting each of said tread members from said rim portion for independent oscillation about an axis disposed generally tangential relative to said retaining means.

11. A resilient wheel comprising a generally cylindrical rim portion including means adapted to be secured to a wheel hub, a plurality of plate-like tread members disposed outwardly of said rim portion and spaced circumferentially thereabout, said tread members and retaining means including coacting means defining a lost motion connection between said retaining means and said tread members mounting said tread members for limited generally radial movement relative to said rim portion between two limit positions, urging means operatively connected between said rim portion and said tread members yieldingly urging said tread members to their radial outermost positions, said coacting means including means also mounting said tread members for limited movement of said tread members circumferentially about said rim portion.

12. The combination of claim 11 including urging means operatively connected between adjacent tread members yieldingly urging adjacent tread members circumferentially about said rim portion away from and toward circumferentially spaced centered positions relative to each other.

13. A resilient wheel comprising a generally cylindrical rim portion including means adapted to be secured to a wheel hub, a plurality of plate-like tread members disposed outwardly of said rim portion and spaced circumferentially thereabout, said tread members and said rim portion including coacting means supporting said tread members from said rim portion by means of a lost motion connection and for limited oscillation of each of said tread members relative to said rim portion along a first axis extending generally radially of said wheel and along and about a second axis generally paralleling the medial plane of said wheel and disposed at generally right angles to the first axis, and urging means operatively connected between said rim portion and said tread members yieldingly urging said tread members to their radial outermost positions and centered circumferentially spaced positions relative to each other and centered positions of oscillation relative to each other along and about said second axis.

References Cited by the Examiner
UNITED STATES PATENTS

| 1,166,148 | 12/1915 | O'Connor | 152—13 |
| 1,791,930 | 2/1931 | Lagard | 152—16 |

FOREIGN PATENTS 486,537   1/1918   France.

ARTHUR L. LA POINT, *Primary Examiner.*

C. W. HAEFELE, *Assistant Examiner.*